June 27, 1944.  J. BOLSEY  2,352,177

MIRROR FOR REFLEX CAMERAS

Filed Dec. 31, 1940

INVENTOR:
Jacques Bolsey
BY
agent

Patented June 27, 1944

2,352,177

UNITED STATES PATENT OFFICE 2,352,177

MIRROR FOR REFLEX CAMERAS

Jacques Bolsey, New York, N. Y.

Application December 31, 1940, Serial No. 372,504
In Switzerland November 8, 1940

12 Claims. (Cl. 95—42)

My present invention relates to reflex cameras, and more particularly to reflex cameras provided with a reflecting mirror, adapted to be positioned in focusing position in the optical axis of the camera, and in picture-taking position outside of this optical axis, and to be moved from focusing into picture-taking position and back.

The main object of my present invention is to provide a camera of the type indicated above being, despite the arrangement of said moving mirror, of small size.

A further object of my invention is to provide for constructive means, adapted to reduce the size of reflex cameras by imparting to the reflecting mirror a new kind of movement, not used heretofore.

Another object of my invention consists in means moving the reflecting mirror by sliding of the lens mount into and out of the camera casing.

Still another object of my invention is to provide common operating means for the reflecting mirror and the shutter mechanism.

In accordance with my present invention I obtain the above objects, particularly the object to reduce the camera size, by providing means which are adapted to impart to the reflecting mirror a combined motion of translation and rotation. It is especially advantageous to impart to the mirror during its movement from picture-taking to focusing position and back a combined motion of rotation around an axis normal to the optical axis of the camera and of translation normal to the same optical axis.

It should be noted that this combined motion might be a true combination of the two movements, i. e., a resulting movement which in each moment is composed of a rotating and a translating movement; the resulting movement might, however, also be composed of consecutive motions of rotation and translation, i. e., the mirror might first rotate from focusing position into a position parallel to the optical axis and then carry out a movement of translation normal to this axis. In both cases, must less space is needed for the movement of the mirror from picture-taking into focusing position and back than in the case that the mirror would carry out a motion of rotation or of translation only.

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawing, in which:

Figure 1:
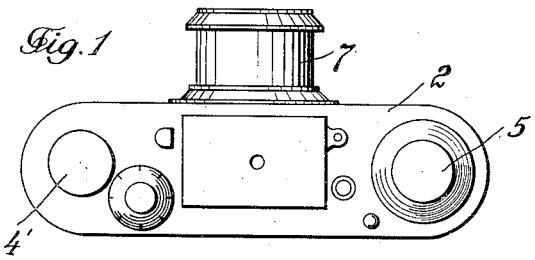
Fig. 1 is a top view of a reflex camera, according to my invention.

As shown in the drawing, the camera comprises a camera casing 2; the top of the casing 2 is provided with a central opening 4 covered by ground glass 3, forming a part of the reflex view-finder system; 4' and 5 indicate the shafts around which the film is wound and unwound, respectively. The lens mount 7 is arranged in the front wall 6 of the casing 2; this lens mount is mounted slidably in direction of the optical axis 8 of the camera.

The reflecting mirror 9 is arranged in the path of the light rays entering the camera, and therewith also in the line of the optical axis 8 of the camera. The mirror is shown in its position for focusing; therefore, I call this mirror-position the "focusing position" of the mirror. For the taking of pictures, the mirror is moved into a position outside of the optical axis, shown by dotted lines and indicated by numeral 10; as the mirror is in this position during the taking of pictures, I call this position the "picture-taking" position of the mirror.

As shown in the drawing, in focusing position the mirror 9 crosses the optical axis 8 of the camera at an angle of about 45 degrees; in picture-taking position, as indicated by numeral 10, it is substantially parallel to and outside of said optical axis; therefore, I have to impart to the mirror a combined motion, e. g., consecutive motions of rotation at an angle of about or exactly 45 degrees around an axis normal to the optical axis 8, and of translation normal to the optical axis, while it is in a position parallel to this axis. The direction of rotating movement is indicated by arrow 11, while the direction of translatory movement is indicated by arrow 12. I must, however, repeat and emphasize that although the arrows shown in the drawing seem to indicate only consecutively movements of rotation and translation, these movements may also be combined during each moment of the movement, i. e., each point of the mirror may move along a curve resulting from combination of these two movements.

As shown in the different embodiments of my invention, I provide means to move the mirror 9 from focusing position into picture-taking position and back, and provide means for movably attaching the mirror to the camera casing in such a manner as to enable the moving means to impart to the mirror the required combined movement.

Figure 2:
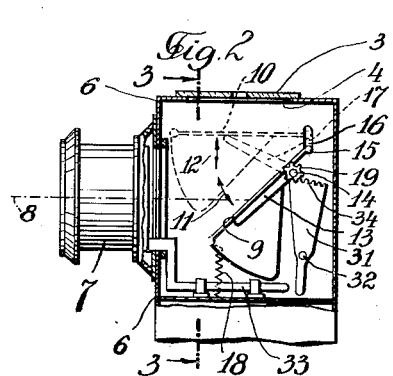
Fig. 2 is a cross-section of the camera shown in Fig. 1, along line 2—2 of Fig. 3.

In the embodiment of my invention, shown in Fig. 2, the means for moving the mirror from its focusing into its picture-taking position, i. e., the means for raising the mirror consist in levers 13 pivoted to the casing wall by means of pivots 14. By turning one of the levers 13 around pivots 14 this lever acts by its free end directly on the back of the mirror and turns it in the direction indicated by arrow 11 around pivots 15 secured to the mirror edges. As the pivots 15 are sliding in longitudinal slits 16 in opposite walls of the casing 2, it is evident that by turning the lever 13 into the position indicated by number 17, the mirror is compelled to carry out a combined motion of rotation around pivots 15 and of translation in direction of slits 16, i. e., to carry out a combined motion in direction of arrows 11 and 12.

In order to bring the mirror back into its focusing position, a return spring 18 is provided for; this spring acts only if no raising force is exerted on the mirror by one of the levers 13.

Figure 3:
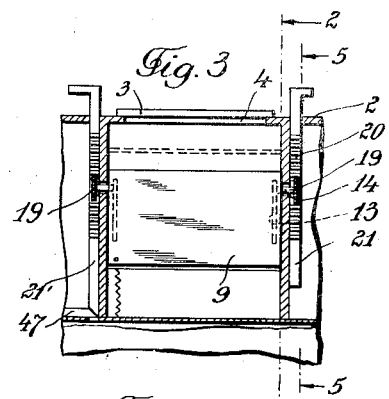
Fig. 3 is a cross-section of the same camera, along line 3—3 of Fig. 2.

The levers 13 may be actuated in different ways: as shown in Figs. 2 and 3, a pinion 19 is mounted on the pivot 14 of one of the levers 13; this pinion 19 is in mesh with the toothed rack 20; this toothed rack 20 is part of a vertical lever 21, mounted by means of guide pins 22 secured to the casing wall, and cooperating slits 23, slidably in vertical direction, as indicated by arrow 24. It is evident that by pushing down this vertical lever 21 by hand, the mirror is raised; by releasing the lever 21, the lever 13 is brought out of contact with the raised mirror 10 and this mirror returns by action of spring 18 into its focusing position, indicated by numeral 9.

Figure 4:
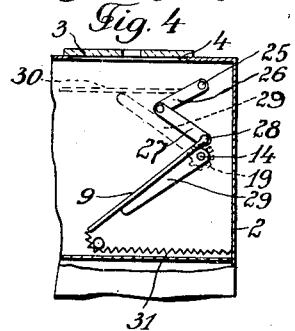
Fig. 4 is a cross-section of a camera showing another embodiment of my invention.
Figure 5:
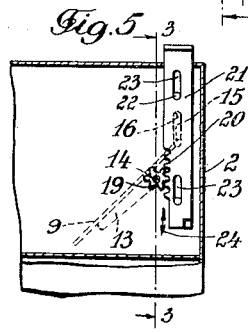
Fig. 5 is a cross-section of the camera shown in Figs. 2 and 3, along line 5—5 of Fig. 3.

As shown in Fig. 4, I may provide instead of the pivot and slit construction shown in Fig. 2, a lever construction pivoted to the casing wall by pivot 25, and consisting of levers 26 and 27. The mirror 9 is secured by hinge-like means 28 to the free end of lever 27. Lever 29, operated in the same way as lever 13 shown in Fig. 2, serves for pushing the mirror into its raised position.

The movement of the mirror during its raising is in this case also a combined one: First the mirror is rotated around the hinges 28 and then it carries out a motion of translation until it comes into its raised position, indicated by numeral 30. The return spring 31 brings the mirror back into its focusing position.

In order to move the mirror by sliding of the lens mount 7 an operating system, consisting of the double-lever 31 turning around pivot 32 and the sliding member 33, is provided for. The lever 31 is provided with a toothed sector 34 in mesh with the small pinion 14. It is evident that by pushing the lens mount 7 into the camera casing the sliding member 33 is pushed against lever 31 and this lever operates, by means of toothed sector 34 and pinion 14, the lever 13, raising thereby the mirror as required.

As indicated above, I may provide means operating the reflecting mirror 9 and the shutter mechanism simultaneously. Thus, for instance, I may extend the operating lever 21' to the bottom of the camera and provide for an operative engagement of this lever with a lever 47, releasing the shutter mechanism (Fig. 3).

Figure 6:
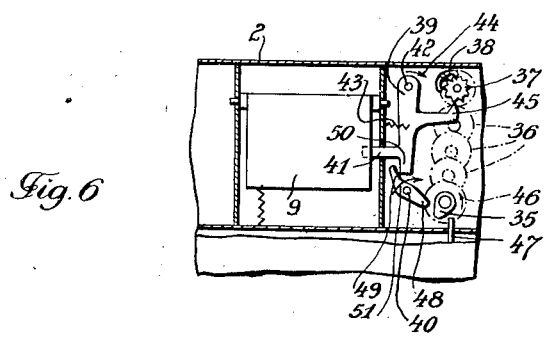
Fig. 6 is a longitudinal section of the camera showing the shutter-controlling means.

Another embodiment of such common mirror and shutter operating means is shown in Fig. 6; in this figure a clockwork for controlling the motion of the shutter is shown. Clockworks of this type are well-known and form no part of my present invention. Therefore, I will not describe this clockwork in detail, but only mention that this clockwork is pre-wound and adapted to drive the cam 35, arranged preferably coaxially with the springs, not shown in the drawing. A gear system 36 transmits the movement of the clockwork upon a ratchet wheel 37; this ratchet wheel cooperates with regulating means 38 holding the speed of rotation of the ratchet wheel, and therewith of each gear driven by the clockwork, constant. This well-known clockwork system cooperates, in accordance with my present invention, with the mirror system by means of levers 39 and 40 in the following way: the raising of mirror 9 releases the first lever arm 41 of the lever 39 pivoted by pivot 42 to the camera casing 2. Thus released, the lever 39 turns by action of spring 43 in the direction indicated by arrow 44; by this movement the lever arm 45, which normally acts as a catch to lock the ratchet wheel 37, releases this ratchet wheel and the clockwork is free to start. During its movement the clockwork rotates the cam 35 in the direction indicated by arrow 46; the rotating cam then comes in contact and acts upon lever 47, releasing the shutter mechanism. At the end of its stroke, i. e., when the cam returns to its original position it acts upon lever arm 48 of lever 40; lever 40, in turn, acts by lever arm 49 upon lever arm 50 of lever 39 in the direction indicated by arrow 51. Thereby the mirror is released and returns into its focusing position by action of return spring 18; by return of the mirror into its focusing position the lever 31, and thereby levers 39 and 45, are turned back into their initial position, thus blocking ratchet wheel 37 and the entire clockwork.

The above description shows that by raising the mirror, the clockwork is started and the shutter released. After exposure, the mirror returns to its focusing position, stopping the clockwork. Thus, this new arrangement is adapted to release the shutter automatically by moving the reflecting mirror of said camera.

It will be understood that each of the elements described above, or two or more together, may also find a useful application in other types of reflex cameras differing from the types described above.

While I have illustrated and described the invention as embodied in reflex cameras, I do not intend to be limited to the details shown, since various modifications and structural changes may be made without departing in any way from the spirit of my invention.

I want to note that the spring moving the mirror may be arranged not only in the manner shown in the drawing and described above, i. e., moving the mirror from picture-taking into focusing position, but the spring may be arranged also in such a manner that it turns to move the mirror from focusing into picture-taking position. In this case lever 13, or other mirror-moving means, must act upon the upper, i. e. reflecting surface of the mirror, pushing this mirror from picture-taking into focusing position.

I want to stress that also this embodiment of my invention should be covered by the following claims.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. In a reflex camera, a camera casing, an objective lens in the front wall of said casing, a movable reflecting mirror within said casing, said mirror being adapted to be positioned in focusing position crossing the optical axis of said objective lens, and in picture-taking position outside of the path of the light rays entering said camera casing through said objective lens and to be moved from focusing into picture-taking position and back, a lens mount for said objective lens being arranged slidably in direction of the optical axis of the camera, means for moving said mirror from focusing to picture taking position and operating means cooperating with said lens mount and said mirror-moving means in such a manner as to move by sliding of said lens mount into said camera casing said mirror from focusing into picture-taking position, thereby substantially freeing the space inside said camera casing for the lens and the lens mount, and a spring member tending to bring said mirror back into focusing position when said lens mount is slid out of said camera casing.

2. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, at least one operating lever moving said reflecting mirror from focusing into picture taking position by pushing against the rear face of said mirror, and means for movably attaching said mirror to said camera casing in such a manner as to enable said operating lever to impart to said mirror motions of rotation of about 45° about an axis normal to said optical axis and of translation normal to both said optical axis and said axis of rotation during its movement from said focusing into said picture taking position.

3. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, at least one operating lever moving said reflecting mirror from focusing into picture taking position by pushing against the rear face of said mirror, said operating lever being independent from said mirror and unconnected with the same and sliding during its operating push on said rear face of said mirror, means pivoting said operating lever to said camera casing in such a manner that in picture taking position of said movable reflecting mirror said lever is outside the path of the light rays entering said camera casing through said objective lens, and means for movably attaching said mirror to said camera casing in such a manner as to enable said mirror to carry out motions of rotation of about 45° about an axis normal to said optical axis and of translation normal to both said optical axis and said axis of rotation during its movement from said focusing into said picture taking position and back.

4. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, at least one operating lever moving said reflecting mirror from focusing into picture taking position by pushing against the rear face of said mirror, said operating lever being independent from said mirror and unconnected with the same and sliding during its operating push on said rear face of said mirror, means for automatically moving said reflecting mirror from picture taking into focusing position whenever said operating lever is not holding said movable mirror in picture taking position, and means for movably attaching said mirror to said camera casing in such a manner as to enable said mirror to carry out motions of rotation of about 45° about an axis normal to said optical axis and of translation normal to both said optical axis and said axis of rotation during its movement from said focusing into said picture taking position and back.

5. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, means for moving said reflecting mirror from focusing into picture taking position, and connecting means co-operating with said lens mount and said mirror moving means in such a manner as to operate said mirror moving means by sliding of said lens mount into said camera casing, thus moving by sliding of said lens mount said reflecting mirror from focusing into picture taking position, thereby providing inside said camera casing free space for said lens mount and the lens carried by the same.

6. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, means for moving said reflecting mirror from focusing into picture taking position, connecting means co-operating with said lens mount and said mirror moving means in such a manner as to operate said mirror moving means by sliding of said lens mount into said camera casing, thus moving by sliding of said lens mount said reflecting mirror from focusing into picture taking position, thereby providing inside said camera casing free space for said lens mount and the lens carried by the same, and means for automatically moving said reflecting mirror from picture taking into focusing position whenever said moving means are not holding said movable mirror in picture taking position.

7. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, means for moving said reflecting mirror from focusing into picture taking position, connecting means co-operating with said lens mount and said mirror moving means in such a manner as to operate said mirror moving means by sliding of said lens mount into said camera casing, thus moving by sliding of said lens mount said reflecting mirror from focusing into picture taking position, thereby providing inside said camera casing free space for said lens mount and the lens carried by the same, and means for movably attaching said mirror to said camera casing in such a manner as to enable said moving means to impart to said mirror motions of rotation of about 45° about an axis normal to said optical axis and of translation normal to both said optical axis and said axis of rotation during its movement from said focusing into said picture taking position.

8. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, means for moving said reflecting mirror from focusing into picture taking position, connecting means co-operating with said lens mount and said mirror moving means in such a manner as to operate said mirror moving means by sliding of said lens mount into said camera casing, thus moving by sliding of said lens mount said reflecting mirror from focusing into picture taking position, thereby providing inside said camera casing free space for said lens mount and the lens carried by the same, means for automatically moving said reflecting mirror from picture taking into focusing position whenever said moving means are not holding said movable mirror in picture taking position, and means for movable attaching said mirror to said camera casing in such a manner as to enable said moving means to impart to said mirror motions of rotation of about 45° about an axis normal to said optical axis and of translation normal to both said optical axis and said axis of rotation during its movement from said focusing into said picture taking position.

9. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, an operating lever moving said reflecting mirror from focusing into picture taking position by pushing against the rear face of said mirror, said operating lever being independent from said mirror and unconnected with the same and sliding during its operating push on said rear face of said mirror, and connecting means co-operating with said lens mount and said operating lever in such a manner as to operate said operating lever by sliding of said lens mount into said camera casing, thus moving by sliding of said lens mount said reflecting mirror from focusing into picture taking position, thereby providing inside said camera casing free space for said lens mount and the lens carried by the same.

10. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, an operating lever moving said reflecting mirror from focusing into picture taking position by pushing against the rear face of said mirror, said operating lever being independent from said mirror and unconnected with the same and sliding during its operating push on said rear face of said mirror, connecting means co-operating with said lens mount and said operating lever in such a manner as to operate said operating lever by sliding of said lens mount into said camera casing, thus moving by sliding of said lens mount said reflecting mirror from focusing into picture taking position, thereby providing inside said camera casing free space for said lens mount and the lens carried by the same, and means for automatically moving said reflecting mirror from picture taking into focusing position whenever said operating lever is not holding said movable mirror in picture taking position.

11. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, an operating lever moving said reflecting mirror from focusing into picture taking position by pushing against the rear face of said mirror, said operating lever being independent from said mirror and unconnected with the same and sliding during its operating push on said rear face of said mirror, connecting means co-operating with said lens mount and said operating lever in such a manner as to operate said operating lever by sliding of said lens mount into said camera casing, thus moving by sliding of said lens mount said reflecting mirror from focusing into picture taking position, thereby providing inside said camera casing free space for said lens mount and the lens carried by the same, and means for movably attaching said mirror to said camera casing in such a manner as to enable said operating lever to impart to said mirror motions of rotation of about 45° about an axis normal to said optical axis and of translation normal to both said optical axis and said axis of rotation during its movement from said focusing into said picture taking position.

12. In a reflex camera, a camera casing, an objective lens in the front wall of said camera casing, a movable reflecting mirror within said casing, said mirror being adapted to be positioned in focusing position crossing the optical axis of said objective lens under 45° and in picture taking position substantially parallel to said optical axis outside of the path of the light rays entering said camera casing through said objective lens and to be moved from focusing into picture taking position and back, a lens mount for said objective lens being arranged slidably in direction of the optical axis of said camera, an operating lever moving said reflecting mirror from focusing into picture taking position by pushing against the rear face of said mirror, said operating lever being independent from said mirror and unconnected with the same and sliding during its operating push on said rear face of said mirror, connecting means co-operating with said lens mount and said operating lever in such a manner as to operate said operating lever by sliding of said lens mount into said camera casing, thus moving by sliding of said lens mount said reflecting mirror from focusing into picture taking position, thereby providing inside said camera casing free space for said lens mount and the lens carried by the same, means for automatically moving said reflecting mirror from picture taking into focusing position whenever said operating lever is not holding said movable mirror in picture taking position, and means for movably attaching said mirror to said camera casing in such a manner as to enable said operating lever to impart to said mirror motions of rotation of about 45° about an axis normal to said optical axis and of translation normal to both said optical axis and said axis of rotation during its movement from said focusing into said picture taking position.

JACQUES BOLSEY.